Oct. 18, 1966    F. A. KROHM    3,279,835
ADAPTER
Original Filed Feb. 27, 1961
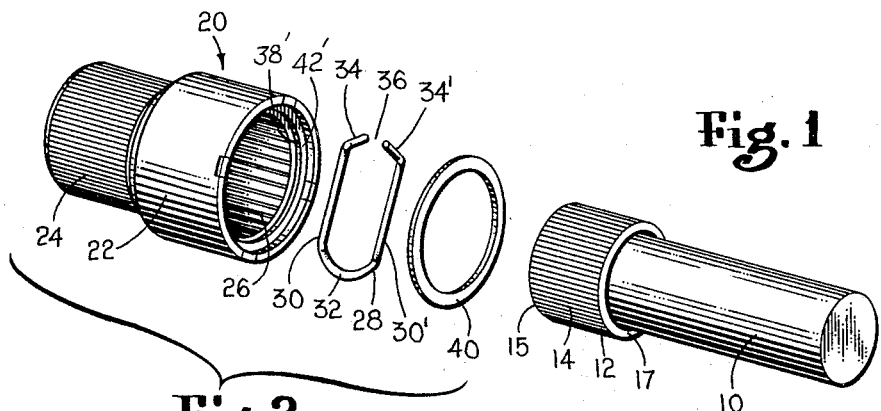
Fig. 1
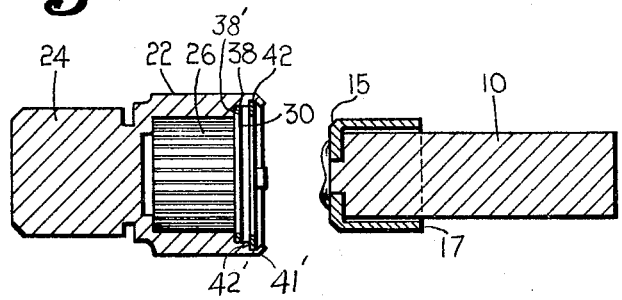
Fig. 2
Fig. 3
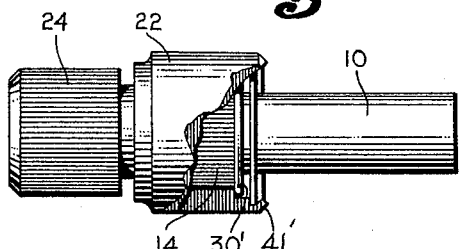
Fig. 4
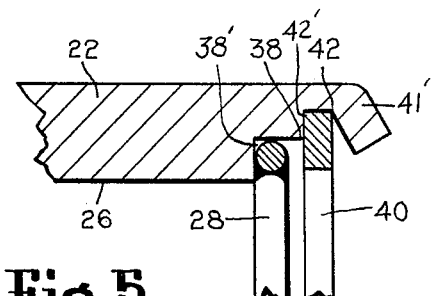
Fig. 5
INVENTOR.
FRED A. KROHM
BY W. E. Recktenwald
K. E. Walden
ATTORNEY

United States Patent Office 3,279,835
Patented Oct. 18, 1966

3,279,835
ADAPTER
Fred A. Krohm, Hobart, Ind., assignor to The Anderson
Company, a corporation of Indiana
Continuation of application Ser. No. 91,940, Feb. 27,
1961. This application Feb. 12, 1964, Ser. No. 344,507
2 Claims. (Cl. 287—119)

This application is a continuation of application Serial No. 91,940, filed February 27, 1961, and now abandoned.

This invention relates to an adapter and is particularly directed to a self-contained snap-on adapter for the end of a rod or shaft.

An object of this invention is to provide a spring-type snap-on adapter.

A further object of this invention is to provide a permanent adapter for a shaft end wherein neither axial nor rotary movement is permitted between the shaft and the adapter.

A still further object of this invention is to provide an adapter for a shaft end which is additionally useful as a shaft extension.

Still another object of this invention is to provide an inexpensive and yet reliable shaft adapter or shaft extension.

One use for this adapter is as a connector between the oscillatory shaft of a windshield wiper drive system and the windshield wiper arm, wherein the drive shaft and wiper arm are of different sizes.

Additional features, uses and advantages of this invention will become apparent in the following description and drawing wherein:

FIGURE 1 is a perspective view of the shaft with an enlarged splined attaching head at one end;

FIGURE 2 is a perspective, exploded view of the adapter with its parts in axial spaced-apart position with respect to the shaft of FIGURE 1;

FIGURE 3 is an enlarged view in cross section of the assembled adapter in a position to be received on the shaft of FIGURE 1;

FIGURE 4 is an enlarged view partly broken away to show the adapter and shaft in firm interlocked embracement; and FIGURE 5 is a greatly enlarged cross-sectional view clearly showing the method of retaining the washer and spring within the adapter.

With reference to the drawing, FIGURE 1 discloses a shaft 10 having an enlarged, generally cylindrically shaped head 12 with splines 14 for receiving a complementary splined member of a tool or mechanical element (not shown). The outer end of head 12 may be provided with a slight taper or chamfer 15 for ease of connection to the adapter, as will be more fully described later in the specification.

Occasionally, it is desired to attach a tool or mechanical member to the shaft head 12 which may be of a different size, either larger or smaller. The present adapter is unique and extremely useful in such an arrangement.

FIGURE 2 shows the adapter, designated 20, wherein the parts are in exploded position prior to assembly. Adapter 20 is comprised of a cylindrically shaped main body 22 having a splined shaft portion 24 at one end and a splined female-receiving portion 26 at the other end, a generally C-shaped spring clip member 28, and a retainer washer 40. Spring clip member 28 and retainer washer 40 are axially positioned in relation to the main body portion 22 and the receiving portion 26. Spring clip 28 is constructed of a small diameter wire formed into a C-shaped configuration having straight parallel side portions 30 and 30' connected at one end by a curved closed end portion 32, and a pair of inturned portions 34 and 34' at the other end defining an opening 36 therebetween. It is to be noted that the parallel side portions 30, 30' are spaced apart a distance slightly less than the diameter of the head 12 at the rear portion 17, but far enough apart to permit their being spread to slide over the splined surface 14 of head 12. The receiving portion 26 is preferably provided with a first recess defined by the cylindrical surface 38 and an adjacent radial annular surface 38'. The closed portion 32 and inturned ends 34, 34' are so formed that they will engage the cylindrical and radial surfaces defining the recess and locate the parallel portions 30, 30' of spring clip 28 in chordal relation with respect to the inner cylindrical or circumferential surface 38. While spring portions 32, 34 and 34' may engage the inner circumferential surface 38, the parallel portions 30, 30' are free between their ends. Inasmuch as clip 28 is formed of spring steel, portions 30, 30' are free to be moved outwardly upon the application of a radial force and to resiliently move back to position when the force is removed.

The receiving portion 26 of the adapter is also provided with a counter-recess somewhat larger in diameter than the recess above referred to. This counter-recess is defined by an inner circumferential surface 42 and an adjacent radial annular surface 42'. A flat circular washer 40 is confined in this counter-recess.

The surfaces of the counter-recess are so designed and disposed to permit washer 40 and spring clip 28 to lie juxtaposed when they are properly received on their respective shoulders adjacent surfaces 42 and 38. The receiving portion is provided with an axially extending rim portion 41' of an extent whereby the same can be crimped or otherwise deformed over washer 40 to fixedly hold the washer and retain the spring clip 28 in position.

It can be seen in FIGURE 4 that with the parts in permanently assembled position, the adapter is capable of being fixedly mounted on the head 12 of shaft 10. Side portions 30, 30' of spring clip 28 are spread apart when they are forced over chamfered portion 15 of head 12 and over head 12 itself in the application of adapter 20 thereto.

FIGURE 4, showing the adapter 20 assembled on head 12, discloses how the straight parallel side portions 30, 30' snap into position against an abutment or an annular shoulder or abutment 17 of head 12 to axially secure the adapter to the shaft. Splines provided within receiving portion 26 mate with complementary splines 14 on head 12 to secure the two members against relative rotary movement.

The splined shaft portion 24 extends axially from the body 22 to provide a connector to receive a tool or mechanical member of a size not operatively receivable on head 12. In the device disclosed, shaft portion 24 is generally larger in diameter than head 12; however, it is to be understood that the relative sizes of the members 12 and 24 do not constitute a limitation of the utility of the disclosed device. In fact, this type of adapter could be used to provide a connection for a mechanical element of any different design such as having a smaller inner diameter, a larger diameter or of different serration or the like design. In addition, it is considered within the teaching of this invention to vary the axial spacing of receiving portion 26 and shaft portion 24 to thereby permit the adapter to act as a shaft extender as well as an intermediate fitting capable of connecting a shaft of one diameter to a member having a different inner diameter.

It is considered within the concept of this invention that certain parts could be reversed. For example, splined shaft portion 24 could be converted to a splined female member within body 22.

Portions 24 and 26 which have splines on the receiving surfaces may be provided with a slight axial taper for ease of connection, but this is not altogether essential and need not be used.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. An adapter for a shaft end defining a coaxial extension therefor to transmit torsional forces and prevent angular displacement of itself from said shaft axis, said adapter for use with a shaft wherein said shaft terminates in a cylindrically shaped axially splined head having shoulder means remote from the end of said shaft, said adapter having a cylindrically shaped axially splined recess complementing and adapted to receive said cylindrically shaped axially splined head in secured axial alignment therewith, said adapter having spring means including a pair of straight portions lying chordally across the entrance to said recess, said straight portions adapted to be resiliently urged laterally aside as said head is received into said recess with said straight portions interlocking with said shoulder means, said adapter having a male portion axially aligned with said recess and remote therefrom in a form of a cylindrically shaped axially splined head including shoulder means resembling said first-mentioned head whereby said shaft is provided with an extension maintained in fixed coaxial alignment thereon.

2. An adapter also defining a shaft extender for use on a shaft which shaft is defined as terminating in a cylindrically shaped axially splined head having an axial shoulder remote from the end, said adapter having a cylindrically shaped head at one end provided with straight axial splines and an axial shoulder remote from the end, said adapter further having a cylindrically shaped recess at its other end axially aligned with and spaced from the cylindrical head, said recess being provided with straight axial splines for cooperatively receiving the splined shaft head in fixed co-axial relationship and also in torque transmitting relationship, C-shaped spring means disposed and secured in a counter recess adjacent the cylindrically shaped recess and having straight portions lying chordally across the opening to said recess whereby they may be urged temporarily aside by the axially splined head to permit entry of the head into the recess and after entry to be received adjacent the axial shoulder on the shaft to prevent axial separation of the adapter from the shaft.

References Cited by the Examiner

UNITED STATES PATENTS

| 1,038,288 | 9/1912 | Carr | 24—218 |
|---|---|---|---|
| 1,397,101 | 11/1921 | Kelly | 85—8.8 |
| 1,543,356 | 6/1925 | Arnold | 285—321 X |
| 2,021,241 | 11/1935 | Mall | 285—305 X |
| 2,136,947 | 11/1938 | Morgan | 287—119 |
| 2,484,192 | 10/1949 | Squiller | 285—305 |
| 2,757,942 | 8/1956 | Eberhart | 285—321 X |
| 2,848,255 | 8/1958 | Klein et al. | 285—321 X |
| 2,906,106 | 9/1959 | Haas | 64—9 |
| 2,952,999 | 9/1960 | Glover | 64—9 X |
| 2,974,501 | 3/1961 | Kaufman et al. | 64—9 |
| 3,065,003 | 11/1962 | Whitehouse | 287—119 |
| 3,070,389 | 12/1962 | Baur et al. | 287—20.5 |
| 3,121,583 | 2/1964 | Damm | 287—119 |

FOREIGN PATENTS 815,428  10/1951  Germany.

CARL W. TOMLIN, *Primary Examiner.*

T. F. CALLAGHAN, I. B. TALTON,
*Assistant Examiners.*